Figure 1:
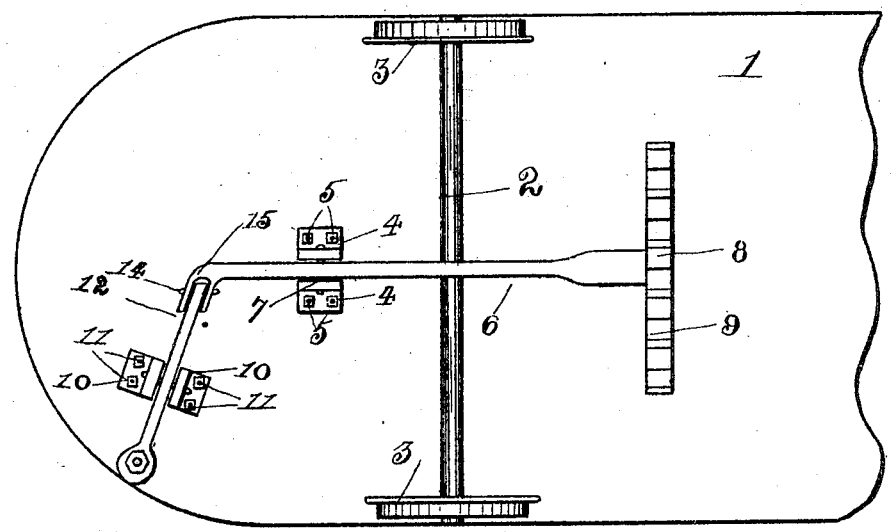

No. 797,896. PATENTED AUG. 22, 1905.
M. KLEIN.
STREET CAR BRAKE.
APPLICATION FILED APR. 29, 1905.

Witnesses.
K. H. Butler
E. A. Rudolph

Inventor:
Mathias Klein.
By H. C. Evert & Co.
Attorneys.

UNITED STATES PATENT OFFICE.

MATHIAS KLEIN, OF PITTSBURG, PENNSYLVANIA.

STREET-CAR BRAKE.

No. 797,896.     Specification of Letters Patent.     Patented Aug. 22, 1905.

Application filed April 29, 1905. Serial No. 258,069.

*To all whom it may concern:*

Be it known that I, MATHIAS KLEIN, a citizen of the United States of America, residing at Pittsburg, in the county of Allegheny and State of Pennsylvania, have invented certain new and useful Improvements in Street-Car Brakes, of which the following is a specification, reference being had therein to the accompanying drawings.

This invention relates to certain new and useful improvements in car-brakes, and relates more particularly to a novel form of auxiliary brake adapted to be used in case of a runaway or accident which would require the immediate stopping of a car.

My invention aims to provide a brake which can be easily and quickly secured upon a car equipped with the ordinary wheel-friction-engaging brakes, and in this connection I have so constructed my improved brake that it can be readily manipulated by the motorman of a car when it is desired to instantly stop the movement of said car.

Briefly described, my improved brake comprises a serrated shoe which is pivotally mounted beneath the bed of a car or the running-gear thereof, and by the employment of pivoted levers a motorman can quickly operate the brake to move the serrated shoe in engagement with the road-bed over which the car is traveling.

The above construction will be hereinafter more fully described and then specifically pointed out in the claim, and, referring to the drawings accompanying this application, like numerals of reference designate corresponding parts throughout the several views, in which—

Figure 2:
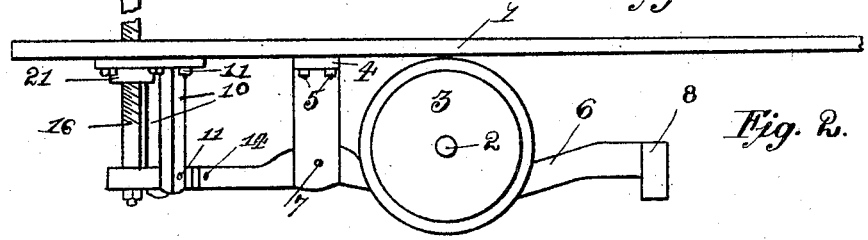
Figure 3:
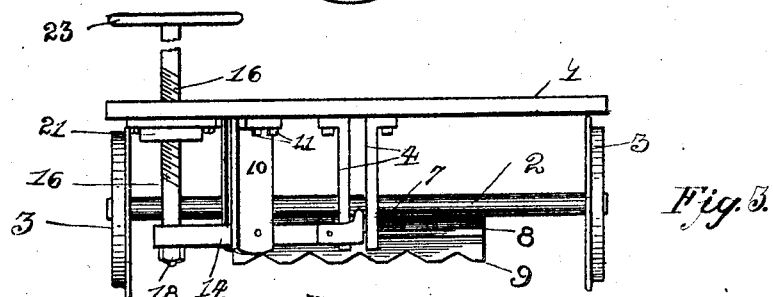
Figure 4:
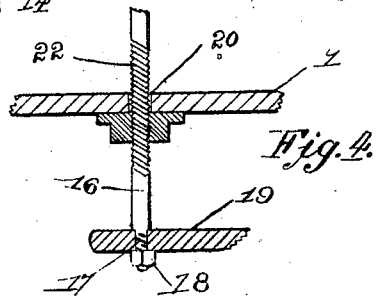

Figure 1 is a bottom plan view of a car bed or platform equipped with my improved brake. Fig. 2 is a side elevation view of the same. Fig. 3 is a front view of the same. Fig. 4 is a detail sectional view of an operating-rod employed in connection with my improved brake.

In the accompanying drawings I have illustrated a bottom plan view of a conventional form of car body or bed and have illustrated an axle 2 and wheels 3 3 to assist those not familiar with the construction of a car to locate and position my improved brake in connection therewith.

Adjacent to the front axle of the car and upon the body or bed thereof I provide depending brackets 4 4, which are secured to the body of the car by suitable bolts and nuts 5 5. Between the brackets 4 4 I pivotally mount a rearwardly-extending bar 6 by a pin 7. The rear end of the bar 6 is provided with a transversely-disposed shoe 8, the lower edge of which is provided with a serrated or roughened surface 9, adapted to engage the road-bed over which a car equipped with my improved brake travels.

To one side of the car-body, adjacent to the front end thereof, I provide depending brackets 10 10, which are secured to the car-body by suitable bolts and nuts 11 11. Between these brackets is pivotally mounted an arm 12 by a pin 14, and the innermost end of said arm is pivotally connected by a pin 14 within the bifurcated end 15 of the bar 6. The opposite end of the arm 12 is attached to the lower end of an operating rod or screw 16, the lower end of said screw being provided with a screw-threaded shank portion 17, upon which a nut 18 is placed to retain the pierced end 19 of the arm 12 in engagement with the screw.

The body of the car is provided with an opening 20, and attached to the underneath surface of the car-body adjacent to said aperture is a nut or collar 21, in which is adapted to operate the screw-threaded portion 22 of the screw or operating rod 16. That end of the operating rod or screw 16 extending upwardly through the car-body 1 is provided with a suitable operating wheel or handle 23.

To manipulate my improved car-brakes, it is only necessary for the motorman or the operator of the car to rotate the screw or operating rod 16 in order to throw my improved brakes into operation. Should it be necessary to place the shoe 8 in engagement with the road-bed, the operating-screw is rotated to lower the end 19 of the arm 12, and by the pivoting of this arm and the bar 6 the shoe will be thrown into engagement with the road-bed, the serrated surface of said shoe engaging the road-bed and bringing the car to a standstill. To release this shoe from engagement with the road-bed, the screw 16 is operated to elevate the end 19 of the arm, which consequently elevates the shoe.

It will be observed from the foregoing description that I have constructed a novel form of brake which is extremely simple in construction, strong and durable, comparatively inexpensive to manufacture, and that cars can be readily equipped with my improved brake without dispensing with the ordinary and conventional form of brakes commonly used and without deranging or dispensing with any part of the car equipment.

It will be noted that various changes may be made in the details of construction without departing from the general spirit and scope of the invention.

What I claim, and desire to secure by Letters Patent, is—

In a car-brake, the combination with a car-body, depending brackets carried by said car-body, a bar pivotally mounted in two of said brackets, a serrated shoe carried by one end of said bar, an arm pivotally mounted in the other of said brackets and having its one end pivotally connected to said bar, a screw-rod operating in said car-body, the lower end of said screw-rod being connected to the loose end of said arm, whereby when said screw is rotated said shoe can be elevated or lowered, substantially as described.

In testimony whereof I affix my signature in the presence of two witnesses.

MATHIAS KLEIN.

Witnesses:
E. E. POTTER,
C. KLOSTERMANN.